(12) United States Patent
Bradburn

(10) Patent No.: US 8,215,669 B2
(45) Date of Patent: Jul. 10, 2012

(54) AIRBAG

(75) Inventor: Alan Bradburn, Staffordshire (GB)

(73) Assignee: Autoliv Development AB, Vargarga (SE)

( * ) Notice: Subject to any disclaimer, the term of this patent is extended or adjusted under 35 U.S.C. 154(b) by 0 days.

(21) Appl. No.: 12/937,094

(22) PCT Filed: Apr. 3, 2009

(86) PCT No.: PCT/EP2009/002445
§ 371 (c)(1),
(2), (4) Date: Oct. 19, 2010

(87) PCT Pub. No.: WO2009/127329
PCT Pub. Date: Oct. 22, 2009

(65) Prior Publication Data
US 2011/0025033 A1    Feb. 3, 2011

(30) Foreign Application Priority Data
Apr. 15, 2008 (DE) .......................... 10 2008 018 857

(51) Int. Cl.
*B60R 21/276* (2006.01)
(52) U.S. Cl. ..................................................... 280/739
(58) Field of Classification Search ................... 280/739
See application file for complete search history.

(56) References Cited

U.S. PATENT DOCUMENTS

| | | | |
|---|---|---|---|
| 5,333,903 A | 8/1994 | Eyrainer | |
| 5,979,937 A * | 11/1999 | Yoshida et al. | 280/743.2 |
| 7,635,148 B2 * | 12/2009 | Sager | 280/739 |

FOREIGN PATENT DOCUMENTS

| | | |
|---|---|---|
| DE | 4101286 A1 | 7/1992 |
| DE | 20003500 U1 | 6/2000 |
| DE | 19517315 A1 | 4/2003 |
| DE | 102004049513 A1 | 4/2006 |
| EP | 0 495 409 A | 7/1992 |
| EP | 1798117 A1 | 6/2007 |
| JP | 06305391 A | 11/1994 |
| JP | 07-017351 A | 1/1995 |

OTHER PUBLICATIONS

International Search Report and Written Opinion of the ISA, ISA/EP, Rijswijk, NL, mailed Jul. 2, 2009.

* cited by examiner

*Primary Examiner* — Eric Culbreth
(74) *Attorney, Agent, or Firm* — Harness, Dickey & Pierce, P.L.C.

(57) ABSTRACT

An airbag has a skin enclosing a gas chamber and the skin has a vent which is closed in the resting state of the airbag and which opens when the pressure in the gas chamber exceeds a pre-determined value is described. The vent includes a vent hole in the skin and a tearable connection closing the vent hole in the resting state of the airbag. The airbag is folded to a package at least along a first direction and the tearable connection connects the skin around the vent hole directly to itself such that the tearable connection extends from a first point to a second point. In order to ensure that the vent remains closed during deployment and that the vent opens after the pressure inside the gas chamber exceeds a predetermined value within a rather small tolerance of the pressure, the line connecting the two points encloses an angle between 30° and 60° with the first direction.

18 Claims, 4 Drawing Sheets

AIRBAG

CROSS-REFERENCE TO RELATED APPLICATIONS

This application is a 371 U.S. National Stage of International Application No. PCT/EP2009/002445, filed Apr. 3, 2009 and published in English on Oct. 22, 2009. This application claims the benefit of German Patent Application No. 10 2008 018 857.3, filed Apr. 15, 2008, the disclosures of which are incorporated by reference herein.

TECHNICAL FIELD OF THE INVENTION

The invention relates to an airbag for a motor vehicle. Such an airbag generally comprises a skin enclosing a gas chamber. More particularly, the invention relates to an airbag which has a vent which is closed in the resting state of the airbag and that opens when the pressure inside the gas chamber exceeds a predetermined value.

A vent of the type described above has the following advantage: Since the vent is closed during at least the beginning of the deployment of the airbag, this deployment occurs very quick leading to a good protection of the person to be protected at an early point in time. When this person falls into the airbag, the pressure in the gas chamber rises and the vent opens leading to the necessary softness of the airbag.

PRIOR ART

Different techniques are known for manufacturing a vent in the skin which is closed in the resting state of the airbag and which opens when the pressure within the airbag chamber exceeds a predetermined value.

For example from GB 2 421 932 A it is known to provide a hole in the skin and to close said skin with an elastic membrane having a small hole. This small hole is closed or almost closed when the gas chamber is empty and enlarges its diameter with rising pressure inside the gas chamber. A drawback of this kind of vent is a rather expensive manufacturing process and a high degree of variation in performance.

Another possibility is to provide a hole in the skin and to close said hole by a flap sewn to the skin by means of a tear seam. Here the problem arises that it is difficult to choose the strength of the tear seam such that it does not break during deployment and does break when the pressure inside the gas chamber exceeds the predetermined value. A further drawback is that the flap might de-attach from the skin completely, which is not desired.

From generic U.S. Pat. No. 3,990,726 it is known to provide a hole in form of a slit in the skin and close said hole directly by means of tearable connection, namely by a tear seam. That means that no extra portion in form of a flap is present and that the skin is connected to itself by means of the tear seam. The advantages of this kind of valve are that the manufacture is very easy and thus cost efficient and that there is no risk of a de-attaching flap. However the problem remains that it is difficult to choose the strength of the tear seam such that both are safely achieved: The vent is closed during deployment and opens when the predetermined pressure inside the gas chamber is reached.

SUMMARY OF THE INVENTION

It is an object of the present invention to provide an airbag of the generic type which ensures that the vent remains closed during deployment and that ensures that the vent opens after the pressure inside the gas chamber exceeds a predetermined value whereby this opening of the vent occurs within a rather small tolerance.

It is a further object of the invention to provide an airbag of the generic type that is easy and cost-effective to manufacture.

The vent of the airbag is a so-called pinched vent, where a tearable seam surrounds the vent hole and thus closes it. According to the invention, the tearable connection which closes the vent hole in the skin of the airbag in the resting state by connecting the skin direct to itself is orientated in a defined manner in respect of the folding direction or the folding directions of the airbag. As long as no chaotic folding is applied, the airbag skin, which is generally a flat object with two parallel walls when lying on a folding table prior to be folded to a package, shows at least one folding direction, in most cases two folding directions being basically parallel to one another. The folding directions can be looked at as geometrical lines being basically parallel to the folding table and the two walls of the unfolded airbag skin.

It has been found out that the force which acts on the tearable connection during deployment heavily depends on the orientation of the tearable connection—in most cases a tear seam—in respect to the folding direction or folding directions. This effect is caused by the fact that during deployment of the airbag the force acting on the tearable connection is to a large extent a force acting on the fabric. The orientation of the tearable connection can easily be defined by a line connecting the two end points of the tearable connection (referred to as first and second point). This line defines an angle with each folding direction. Or to be more precisely in terms of geometry: This angle is defined when projecting the line connecting the first and the second point of the tearable connection and the folding direction to the plane defined by the folding table, whereas the direction of the projection is perpendicular to the plane of the folding table. The dependency of the force acting on the tearable connection has maximums at 0° and 90°, that is when the line connecting the two end points of the tearable connection is parallel or perpendicular to the folding direction, and has a minimum at an angle of 45°. Thus, according to the invention the angle is between 30° and 60°, preferably about 45°.

The 45° angle has the further advantage that if the airbag is folded into two directions being perpendicular to each other, the angle between the line connecting the end points of the tearable connection and the two folding directions is the same, namely 45°.

BRIEF DESCRIPTION OF THE DRAWINGS

The invention will now be described by ways of example in view of the accompanying drawings, in which.

DESCRIPTION OF A PREFERRED EMBODIMENT

Now, an embodiment of the invention is described with view to the FIGS. 1 to 7. The following conventions apply: Visible edges are drawn in solid lines, non-visible edges are drawn in broken lines, visible seams (irrespective whether tear seam or durable seam) are drawn as dot-dash-dot lines, non-visible seams are not drawn.

Figure 1:
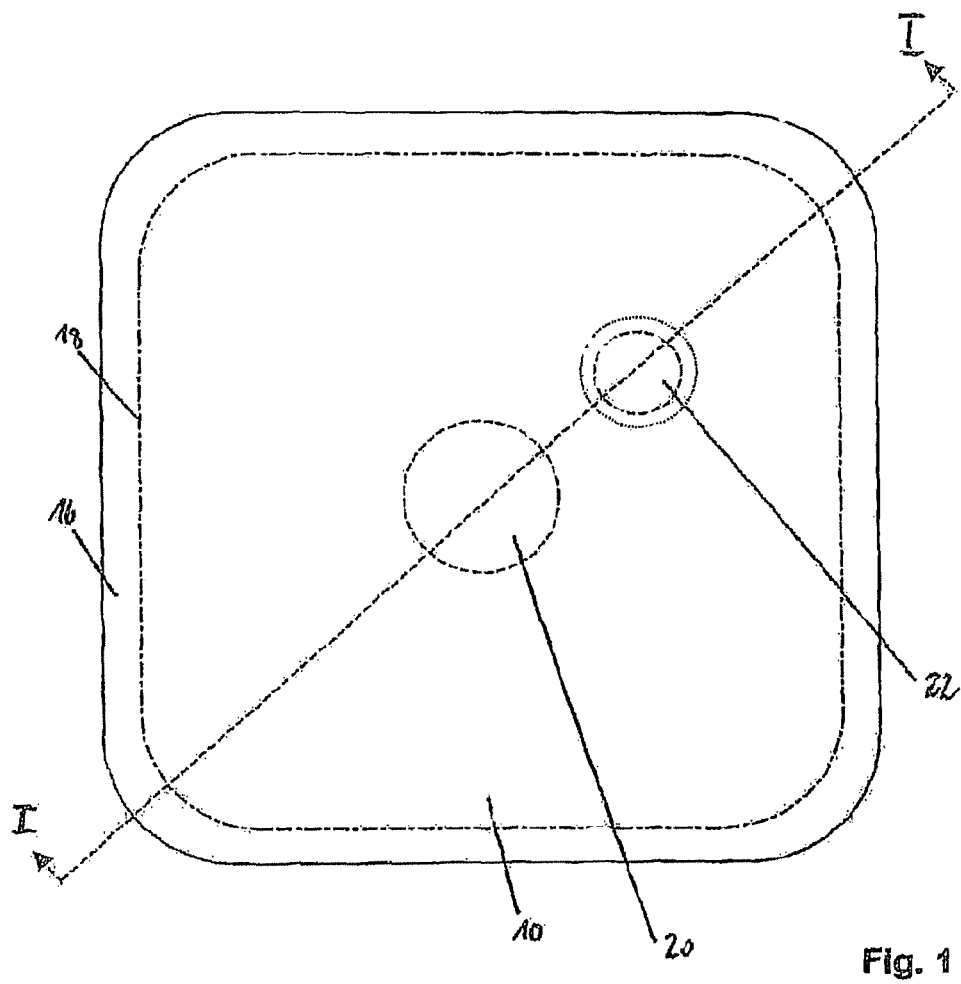
FIG. 1 is a top view of an unfolded airbag having a vent hole for forming a vent, said airbag lying on a flat surface.

FIG. 1 shows a top view of a not finished airbag lying on a flat surface like a table. This table serves for the following as reference plane which is parallel to the drawing plane. The airbag has a skin 10 comprising two layers of same shape and size, namely a first layer 12 on top and a second layer 14 under the first layer. The two layers 12,14 are connected to each other in the margin area 16 and enclose a gas chamber 35 (see FIG. 2). In the embodiment shown, the two layers are made of separate cuttings sewn together by means of a margin seam 18. But it needs to be mentioned that one-piece-woven techniques can also be used.

Figure 2:
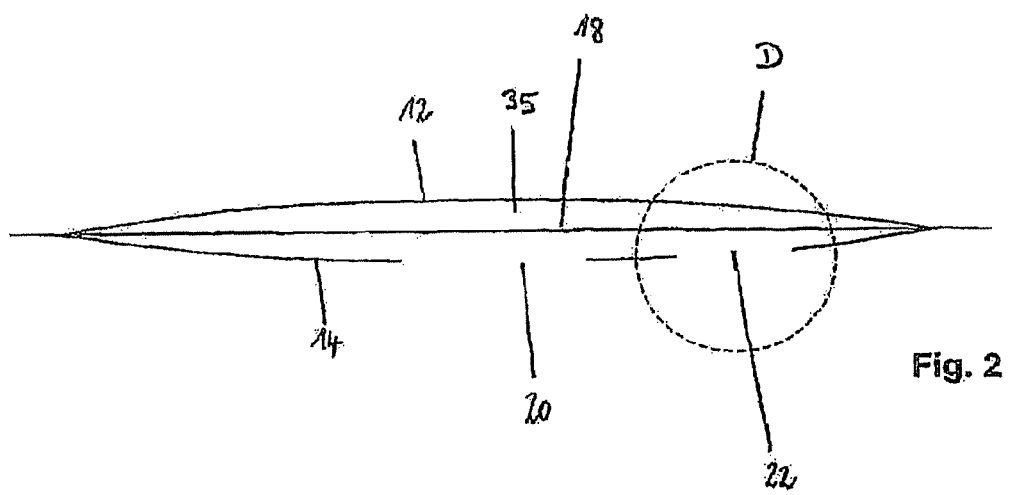
FIG. 2 is a sectional view along line I-I in FIG. 1.

The FIG. 2 shows a sectional view along line I-I of FIG. 1. In order to explain the details, the two layers are not shown as lying directly on one another as they would in "real life". A surface on which the airbag lies is, not shown. The FIG. 3 shows the detail D of FIG. 2.

The airbag in the shown embodiment is a frontal airbag. The first layer 12 is free of holes or the like and serves as impact surface. The second layer 14 points in mounted and inflated state basically towards the instrument panel or the steering wheel. The second layer 14 shows two holes, namely the vent hole 22 and the to gas generator hole 20 for inserting a not shown gas generator. A further vent hole could be present, if needed. In FIG. 1 a dotted line is drawn around the vent hole 22, this dotted line shows the position where a tear seam is applied.

Figure 3:
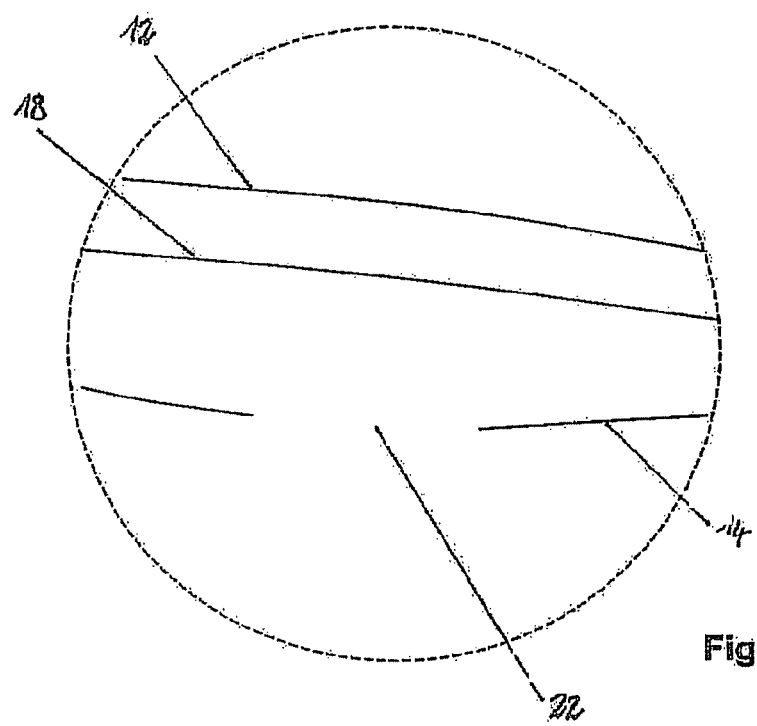
FIG. 3 is the detail D of FIG. 2.
Figure 4:
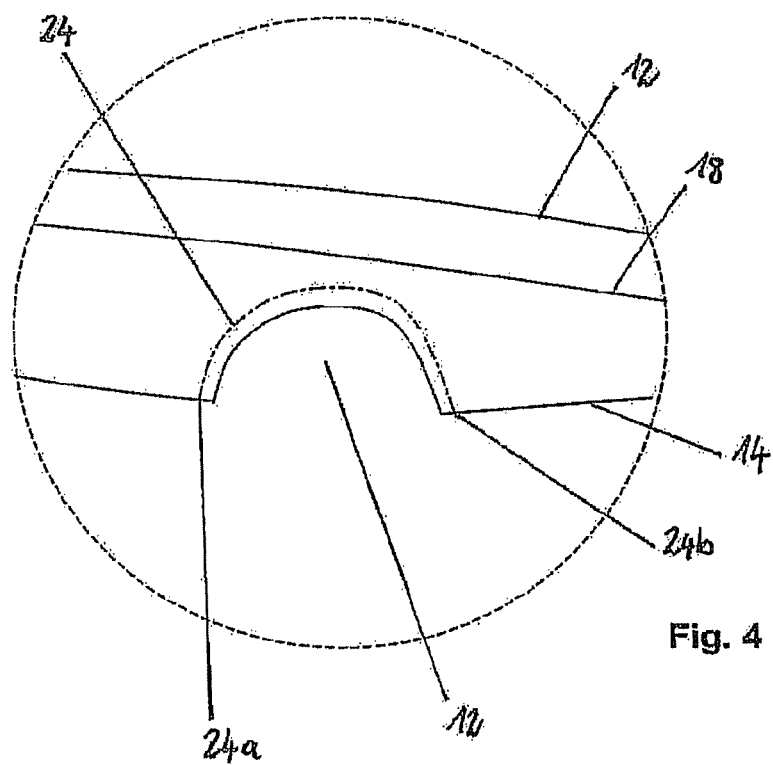
FIG. 4 shows the items of FIG. 3 after applying a tear seam around the vent hole.
Figure 5:
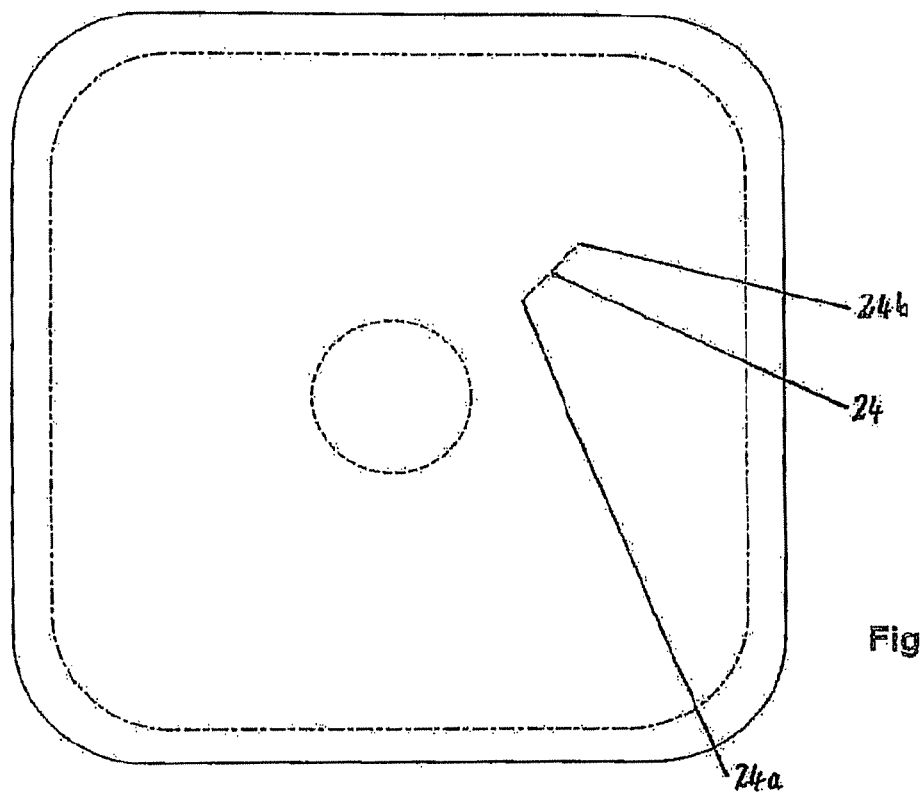
FIG. 5 is a top view of the airbag of FIG. 1 after the tear seam around the vent hole is applied.
Figure 6:
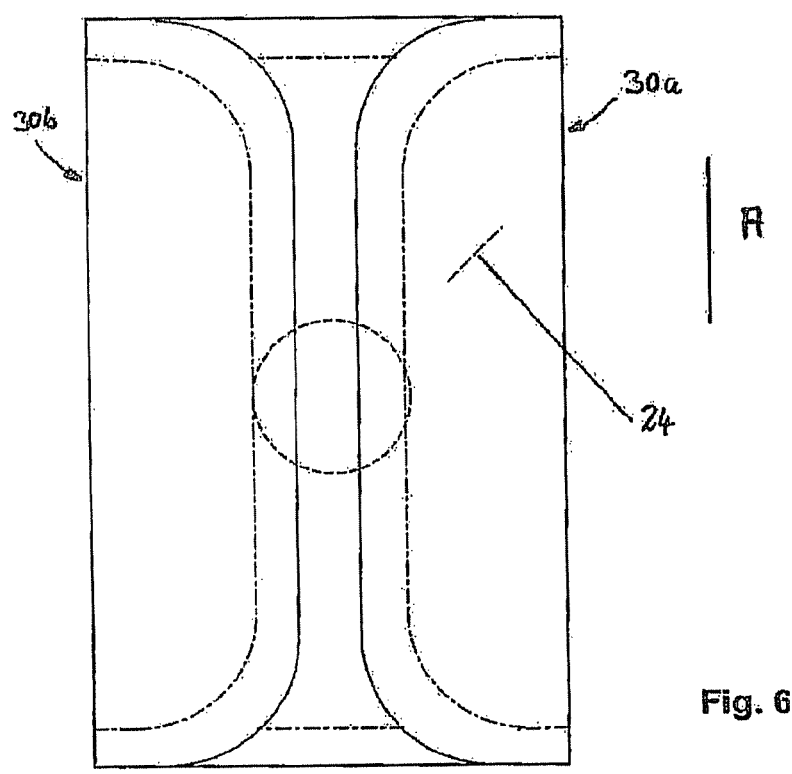
FIG. 6 is the top view of FIG. 5 after the airbag has been folded along first folding lines being parallel to each other.
Figure 7:
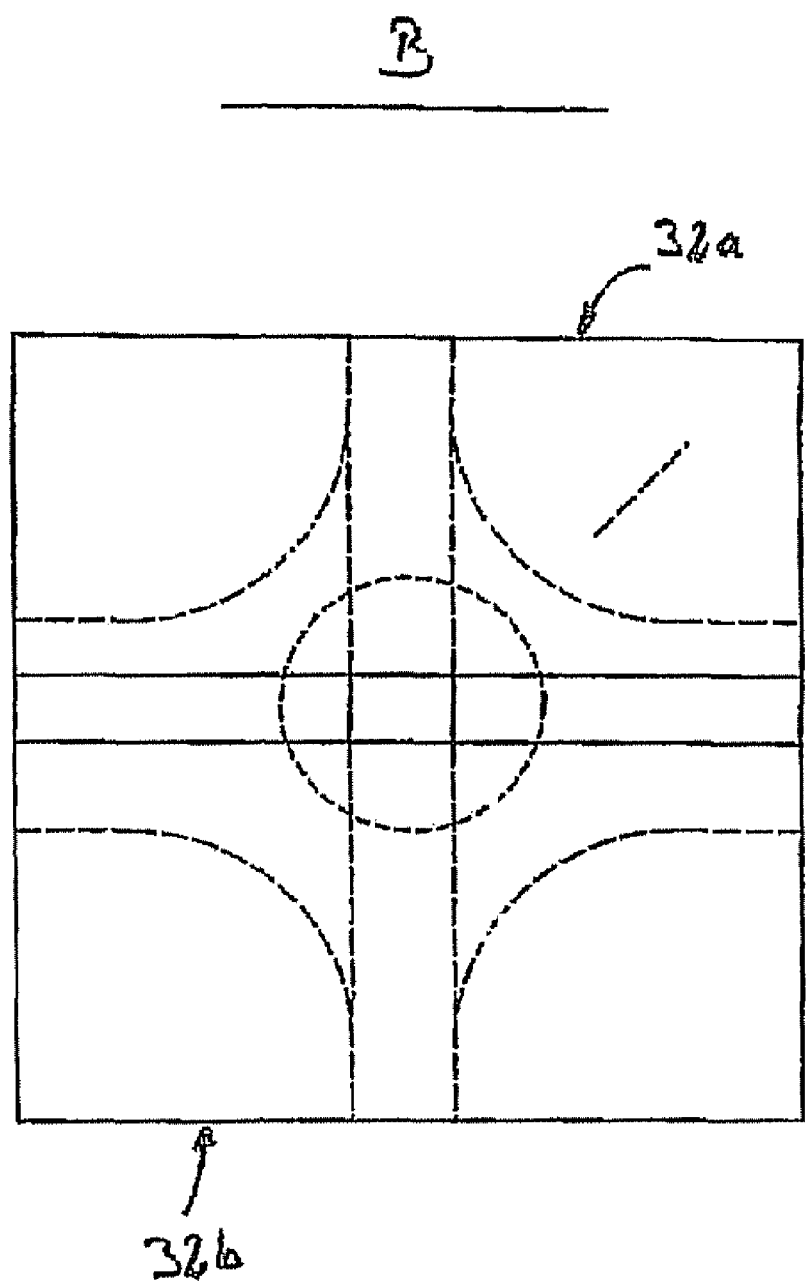
FIG. 7 is the top view of FIG. 6 after the airbag has been folded along second folding lines being parallel to each other and perpendicular to the first folding lines.

The FIG. 4 shows what is shown in FIG. 3 after the tears seam 24 has been sewn around the vent hole 22 and connecting the second layer 14 to itself. The tear seam has basically the shape of a half-circle extending from a first point 24a to a second point 24b. These two points 24a,24b are chosen such that they lie on the line I-I of the sectional view, so that the line connecting the two points has an orientation as shown in FIG. 5. As long as the two layers are not pressed together, the projection of the tear seam into the drawing plane has the same orientation.

After the application of the tear seam the airbag is complete and can—often after a not shown insertion of a gas generator—be folded to a package. In the embodiment shown the airbag is folded along two first lines 30a, 30b being parallel to each other and defining a first folding direction A (shown in FIG. 6) and along two second folding 32a, 32b lines being parallel to each other and perpendicular to the first folding lines 30a,30b and defining a second folding direction B (shown in FIG. 7). One can see that the line connecting the two points 24a, 24b encloses a 45° angle with the first folding direction A as well as with the second folding direction B. This orientation of tear seam 24 in relation to the folding directions A, B leads to low stress in the tear seam during deployment of the airbag, when the skin unfolds along the folding lines 30a, 30b, 32a, 32b. Consequently, the tear seam 24 can have a predetermined weakness, so that it certainly opens when the pressure inside the gas chamber rises as soon as the person to be protected hits the impact surface.

The tearable connection in the embodiment shown is a tear seam. Glued or welded tearable connections can of course also be used. It is also possible to have a woven connection as tearable connection.

List Of Reference Numbers
10 Airbag skin
12 first layer
14 second layer
16 margin area
18 margin seam
20 gas generator hole
22 vent hole
24 tear seam
24a first point
24b second point
30a,b first folding line
32a,b second folding line
35 gas chamber
A first direction
B second direction

The invention claimed is:

1. An airbag comprising:
a skin enclosing a gas chamber; and
a vent hole in the skin defining a vent which is closed in a resting state of the airbag and which opens when a pressure in the gas chamber exceeds a pre-determined value, a tearable connection closing said vent hole;
wherein the airbag is folded to a package at least along a first direction, the tearable connection connects the skin around the vent hole directly to itself such that the tearable connection completely circumscribes the vent hole and extends from a first point to a second point, and a line connecting the two points is oriented with respect to the first direction at a first angle between 30° and 60°.

2. The airbag according to claim 1, wherein the first angle is approximately 45°.

3. The airbag according to claim 2, wherein the airbag is further folded along a second direction, the second direction substantially perpendicular to the first direction.

4. The airbag according to claim 3, wherein the line is oriented with respect to the second direction at second angle between 30° and 60°.

5. The airbag according to claim 4, wherein the second angle is approximately 45°.

6. The airbag according to claim 1, wherein the tearable connection is a tear seam.

7. The airbag according to claim 1, wherein the tearable connection is a welded or glued connection.

8. The airbag according to claim 1, wherein the tearable connection is a woven connection.

9. The airbag according to claim 1, wherein the line generally has the shape of a half-circle.

10. The airbag according to claim 1, wherein the tearable connection is configured to rupture after unfolding of the airbag along the first direction.

11. An airbag comprising:
an inflatable skin defining a gas chamber, the inflatable skin folded in a resting state along at least a first fold line; and
a vent hole in the skin defining a vent which is closed in the resting state; and a tearable connection closing the vent hole, the tearable connection operative to allow the vent hole to open in response to a pressure in the gas chamber exceeding a pre-determined value; the tearable connection completely circumscribing the vent hole and connecting the skin around the vent hole directly to itself such that the tearable connection extends from a first point to a second point, a line connecting the two points being oriented with respect to the first fold line at a first angle between 30° and 60°.

12. The airbag according to claim 11, wherein the tearable connection is configured to rupture after unfolding of the airbag along the first direction.

13. The airbag according to claim 11, wherein the inflatable skin is folded along a second fold line, the second fold line being perpendicular to the first fold line.

14. The airbag according to claim 11, wherein the first angle is approximately 45°.

15. The airbag according to claim 11, wherein the second fold line is oriented relative to the line at a second angle between 30° and 60°.

16. The airbag according to claim 15, wherein the second end is approximately 45°.

17. The airbag according to claim 16, wherein the first and second angles are between 30° and 60°.

18. The airbag according to claim 11, wherein the tearable connection is a tear seam.

* * * * *